United States Patent [19]

Brown

[11] Patent Number: 4,993,533
[45] Date of Patent: Feb. 19, 1991

[54] MANUAL CONNECT-DISCONNECT OPERATOR

[75] Inventor: Neil L. Brown, Stillman Valley, Ill.

[73] Assignee: Sundstrand Corporation, Rockford, Ill.

[21] Appl. No.: 418,494

[22] Filed: Oct. 10, 1989

[51] Int. Cl.⁵ ........................ F16D 23/12; F16D 11/10
[52] U.S. Cl. .............................. 192/114 R; 192/93 B; 192/99 A; 74/99 A; 74/527
[58] Field of Search ................ 192/114 R, 93 R, 93 B, 192/95, 101, 99 R, 99 A, 99 S, 94; 74/99 A, 527

[56] References Cited

U.S. PATENT DOCUMENTS

| | | | |
|---|---|---|---|
| 2,379,776 | 7/1945 | Young | 74/11 |
| 2,465,054 | 3/1949 | Berg | 192/94 |
| 3,001,620 | 9/1961 | Olcheng et al. | 192/94 X |
| 3,455,420 | 7/1969 | Blanchord, Jr. | 192/114 R X |
| 3,760,920 | 9/1973 | Delfeld | 192/93 R |
| 4,434,881 | 3/1984 | Denk et al. | 192/101 X |
| 4,684,000 | 8/1987 | Brown | 192/67 R |

FOREIGN PATENT DOCUMENTS 875197 8/1961 United Kingdom ............. 192/93 R

Primary Examiner—Richard Lorence
Attorney, Agent, or Firm—Wood, Phillips, Mason, Recktenwald & VanSanten

[57] ABSTRACT

Difficulty in achieving the disconnection of two relatively rotatable elements (14) and (30) is avoided in a simple manual connect-disconnect operator which includes a coupling shaft (42) for interconnecting the rotary members (14), (30) and a translatable carrier (38) which journals the coupling shaft (42) for rotation about an axis and further mounts the coupling shaft (42) for movement between connect and disconnect positions. A yoke (60) is mounted on a pivot (66), (100) and is connected to the carrier (38) to move the coupling shaft (42) upon pivotal movement of the yoke (60). The support shaft (108) is mounted for reciprocating movement along its longitudinal axis and a handle (132) is pivotally mounted on the support shaft (108). A detent system (140), (142), (144), (146) provides for retaining the support shaft (108) in positions corresponding to the connect and disconnect positions by reciprocating and rotating the handle (132) along the axis of the support shaft (108) and a reciprocating motion to rotary converting motion mechanism (104), (106) interconnects the support shaft (108) and the yoke (60) so that when the support shaft (108) is moved along its axis by the handle (132), the yoke (60) will pivot to move the carrier (38) between the connect and disconnect positions.

14 Claims, 2 Drawing Sheets

MANUAL CONNECT-DISCONNECT OPERATOR

FIELD OF THE INVENTION

This invention relates to a manually operated connect-disconnect coupling that may be utilized in a mechanical power transmission path.

BACKGROUND OF THE INVENTION

There are a large variety of apparatus that require the presence of some sort of means whereby a mechanical power transmission path, frequently between two rotary elements, may be selectively interrupted. That is to say, it is desirable to provide some sort of coupling mechanism whereby the rotary elements may be connected or disconnected.

Clutches are often used for the purpose but clutches are subject to wear and slippage when worn. In those instances where the elements are to be connected or disconnected only when the apparatus including the coupling is in a quiescent form, a clutch is not even necessary.

A typical example of an apparatus requiring a nonclutch type of connect-disconnect coupling is a so-called AMAD which is the accessory drive unit for driving hydraulic pumps, electrical generators, etc. by means of a power takeoff from an aircraft main turbine engine. Frequently, ground servicing will require that the accessories as mentioned above be checked and it is desirable that the mechanical connection between such accessories in the main engines be interrupted to facilitate servicing, inspection, or the like.

As is well known, AMADs and the associated auxiliary or accessory devices are most often housed in aerodynamically shaped engine cowlings where space is at a premium. Thus, it is desirable that a connect-disconnect coupling for use in an AMAD be simple in construction, easy to operate and be readily accessible The present invention is directed to accomplishing those goals.

SUMMARY OF THE INVENTION

It is the principal object of the invention to provide a new and improved manual operator for a connect-disconnect coupling in a mechanical power train.

An exemplary embodiment of the invention achieves the foregoing object in a structure including a coupling member, a translatable carrier journalling the coupling member for rotation about an axis and mounting the coupling for axial movement along the axis between connect and disconnect positions, and a lever mounted on a pivot and connected to the carrier for translating the carrier to move the coupling member upon pivotal movement of the lever. According to the invention, there is provided a support shaft mounted for movement along its axis which includes an operating section along with a reciprocating motion to rotary motion converting mechanism that interconnects the support shaft and the lever so that when the support shaft is moved along its axis by manual application of force to the operating section, the lever will pivot to move the carrier between the connect and disconnect positions.

In a highly preferred embodiment of the invention, the lever is in the form of a yoke and the operating section of the support shaft has a handle mounted thereon. In a preferred embodiment of the invention, a detent mechanism is associated with one of the handle and the support shaft for positively locating the support shaft in positions corresponding to the connect and disconnect positions. In a highly preferred embodiment, the detent mechanism is associated with the handle and the handle is movably connected to the support shaft so as to be movable relative to the support shaft to cooperate with the detent mechanism.

In the preferred embodiment, the detent mechanism comprises a branched slot and a pin movable within the slot between the branches thereof. Preferably, the slot is on the handle and the pin is mounted on a housing. The handle in turn is pivotally mounted to the support shaft.

In a preferred embodiment of the invention, the reciprocating motion to rotary motion converting mechanism includes pins engaged in a helical slot.

Preferably, the pivot for the yoke or lever is defined by a drive rod and the same carries a pin which is received in a helical slot within the support shaft so that reciprocation of the latter causes rotation of the former.

The invention also contemplates the provision of selectively operable locking means for locking the carrier in the desired position so that the connect-disconnect coupling cannot be operated. Preferably, such locking means comprises a movable pin that is engageable with the carrier and a piston is provided for moving the pin.

Other objects and advantages will become apparent from the following specification taken in connection with the accompanying drawings.

DESCRIPTION OF THE PREFERRED EMBODIMENT

Figure 1:
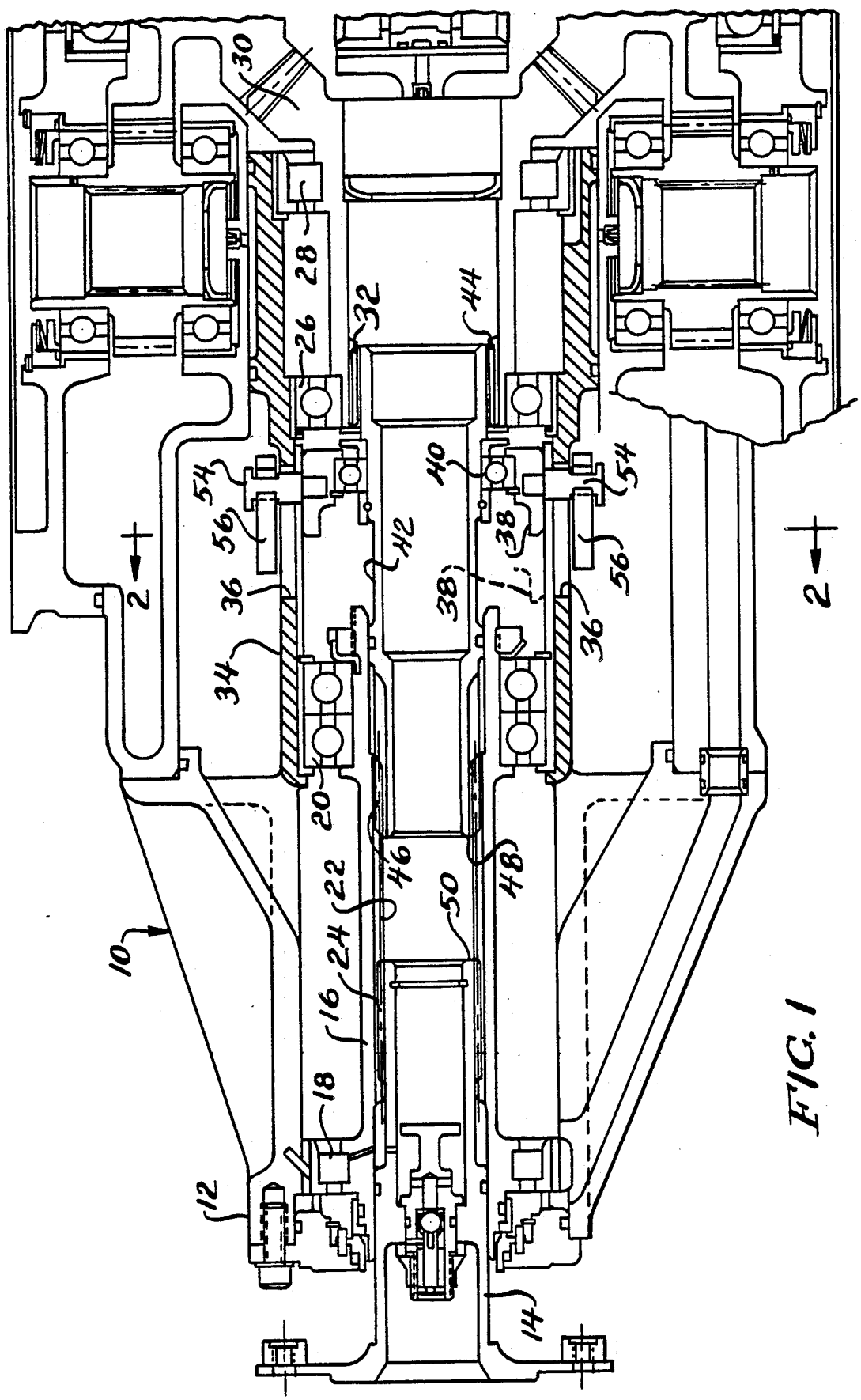
FIG. 1 is a fragmentary, sectional view of part of an AMAD embodying a manual connect-disconnect operator made according to the invention.

An exemplary embodiment of a manual connect-disconnect operator made according to the invention is illustrated in the drawings and with reference to FIG. 1 is seen to be in the environment of an AMAD including a housing, generally designated 10. Within one end 12 of the housing 10 there is journalled a shaft 14 which is adapted to be connected to the power takeoff for an aircraft turbine engine or the like. The shaft 14 is received within a shaft 16 within the housing 10 and journalled therein by means of bearings 18 and 20. The shaft 16 is hollow and includes an interior spline 22 which is engaged by a spline 24 on the exterior of the shaft 14 to make a driving connection.

Bearings 26 and 28 within the housing journal a bevel gear 30 which is conventionally coupled to a transmission which in turn drives accessory devices such as hydraulic pumps, generators, etc. (none of which are shown). The bevel gear 30 is hollow and includes an interior spline 32.

The housing 10 includes an internal neck 34 which mounts the bearings 20, 26 and 28 as described previously and which includes opposed axial slots 36 for purposes to be seen.

Within the neck 34 is a ring-like carrier 38 movable between the solid and dotted line positions illustrated in FIG. 1. The carrier 38 mounts a bearing 40 which in turn journals a coupling shaft 42 for rotation within the housing 10.

As viewed at FIG. 1, the coupling shaft 42 includes an external spline 44 that is engageable with the internal spline 32 on the bevel gear 30. At its opposite end, the coupling shaft 42 includes an external spline 46 which is engaged with the internal spline 22 within the shaft 16. It will also be observed that when the spline 44 is engaged with the spline 32, the opposite end 48 of the coupling shaft 42 is substantially spaced from the right most end 50 of the shaft 14, and that such spacing is greater than the length of the spline 32. Consequently, it will be appreciated that if the coupling shaft 42 is moved to the left as viewed in FIG. 1 sufficiently as to disengage the spline 44 from the spline 32, the end 48 of the coupling shaft 42 will not engage the end 50 of the shaft 14 to thus permit such uncoupling movement to occur.

When such movement has occurred, the power path from the shaft 14 to the bevel gear 30 will have been interrupted, that is, the shaft 14 will be disconnected from the bevel gear 30.

To reconnect the same, the coupling shaft 42 is moved back to the solid line position shown in FIG. 1. Preferably, the facing ends of the splines 32 and 44 have so-called "boat tail" ends to readily facilitate positive, guided reengagement.

The carrier 38 is in the form of a sleeve and may be termed a throw out sleeve. Projecting radially outward from the throw out sleeve 38 and through the slots 36 in diametrically opposite directions are pins 54. As can be seen in both FIGS. 1 and 2, the pins 54 are received in arms 56 of a yoke, generally designated 60. As seen in FIG. 3, the ends of the arms 56 are slotted as at 62 to receive the pins 54.

A lug 64 forming part of the housing 10 includes an internal bore 66. A yoke pivot rod 68 extends through the bore 66 and is secured to the yoke 60 by a threaded fastener 70. Thus, the yoke 60 is mounted for pivotal movement on the lug 64 and the extremes of such movement is illustrated in FIG. 3. Such pivotal movement of course will move the pins 54 generally along the rotational axis of the coupling shaft 42 and thus reciprocate the throw out sleeve 38 between the solid and dotted line positions illustrated in FIG. 1 to couple and uncouple the shaft 14 and the bevel gear 30.

In some instances, it may be desirable to prevent the throw out sleeve 38 from being moved and thus a locking mechanism, generally designated 72 may be provided. The locking mechanism 72 includes a hydraulic cylinder 74 bored in the housing 10 itself and mounting a piston 76. The piston 76 is spring biased by a spring 78 away from the throw out sleeve 38.

Mounted with the piston 76 is a pin 80 which is operable to move into a recess 82 in the exterior of the throw out sleeve 38. When such occurs, the throw out sleeve 38 cannot be translated between its two extreme positions of movement and the coupling is locked up. Hydraulic fluid under pressure may be applied to the piston 78 in a chamber 84 to cause such movement.

Figure 4:
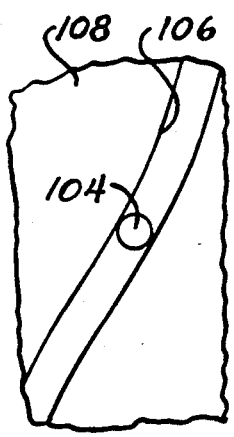
FIG. 4 is a developed view of one type of pin and slot construction used in the invention.
Figure 5:
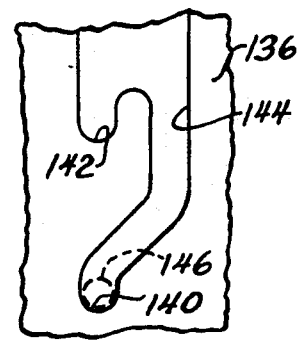
FIG. 5 is a developed view of another form of pin and slot construction utilized in the invention.

The means by which the yoke 60 may be pivoted to move the coupling shaft 42 between connected and disconnected position will be described in connection with FIGS. 2, 4 and 5.

A drive rod 90 is received in a tubular, outer housing section 92 and includes a tanged end 94 received in a slot 96 in the yoke pivot rod 68. This arrangement allows a connection between the two to be established simply by inserting the drive rod 90 into the housing 92.

A bearing assembly 98 mounted within the housing 92 journals the drive rod for rotation about its longitudinal axis shown at 100.

Near its end 102 remote from the tanged end 94, the drive rod mounts a pin 104 which has opposite ends received in opposed slots 106 in a hollow support shaft 108. As seen in FIG. 4, the slots 106 are helical.

The support shaft 108 in turn is reciprocally mounted in a housing mounting structure 110 which extends into the housing 92 and in fact is responsible for positioning the bearings 98 in the desired location. Near its end 112 at its position closest to the yoke 60, the support shaft 108 includes a radially outwardly projecting, annular flange 114. A compression coil spring 116 is interposed between the flange 114 and a step 118 on the mounting section 110. The compression coil spring 116 thus serves to bias the support shaft 108 to the position illustrated.

A pin 120 is carried by the support shaft 108 and is received in longitudinal, straight slots within the mounting element 110. Consequently, the pin 120 and its location in the slots 122 prevents rotation of the support shaft 108 relative to the remainder of the components.

Figure 2:
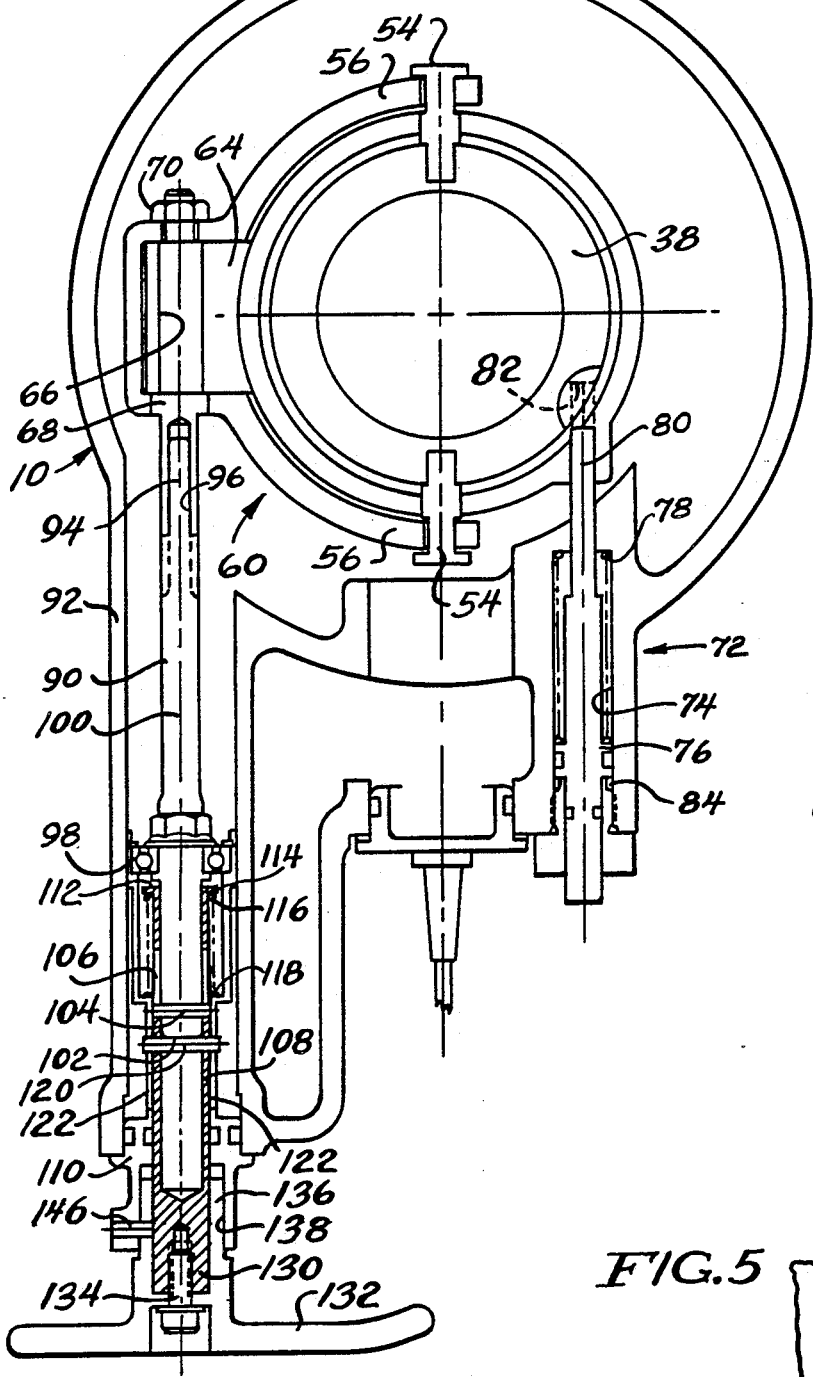
FIG. 2 is a sectional view taken approximately along the line 2—2 in FIG. 1.
Figure 3:
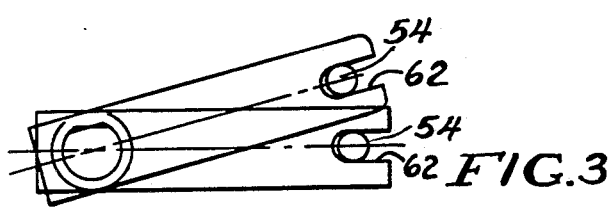
FIG. 3 is a view of a yoke construction.

As a consequence of this construction, if the support shaft 108 is moved downwardly from the position illustrated in FIG. 2, that is, out of the housing 92, the engagement of the pin 104 within the helical slots 106 will cause the drive rod 100 to rotate about its axis to thereby pivot the yoke 60 and translate the carrier between connect and disconnect positions. For the configuration of the components illustrated in FIG. 2, it is preferable that the same correspond to the connect position which is to say that movement of the drive rod 108 out of the housing 92 from the position shown will cause disconnection of the shaft 14 from the bevel gear 30 (FIG. 1).

Such movement will be against the bias provided by the spring 116 so it can be readily appreciated that the spring 116 will operate to return the support shaft 108 to the position illustrated in FIG. 2.

One end 130 of the support shaft 108 extends from the mounting element 110 and a T-handle 132 is pivotally mounted on the end 130 by a fastener 134. A section 136 of the T-handle 132 extends into a bore 138 at the end of the mounting element 110. FIG. 5 illustrates a branched slot that is formed in the section 136 of the handle 132. The same includes axially spaced recesses 140 and 142 which are interconnected by a circumferentially offset longitudinal channel 144. The recesses 140 and 142 open axially and the recess 140 is adapted to receive a pin 146 carried by the mounting element 110 when the support shaft 108 is in the position illustrated, that is, when the spline 44 on the coupling shaft 42 is engaged with the spline 32 on the bevel gear 30. By pulling on the handle 132 and pivoting the same, the slots including the recesses 140, 142 and channel 144 may be reoriented with respect to the pin 146 so that the handle may pull the support shaft 108 downwardly from the position illustrated in FIG. 2 to cause disengagement as a result of the conversion of reciprocating motion to rotary motion provided by the pin 104 in the slots 106. Once sufficient downward motion has been accomplished, the handle 132 may be rotated to cause the pin 146 to reside and be positively retained in the slot 142 which corresponds to a disengaged position.

Engagement of the mechanism may be accomplished by reversinq the previously mentioned movement, it being kept in mind that the spring 116 operates to bias the support shaft 108 towards the engaged position.

From the foregoing, it will be appreciated that the manual connect-disconnect operator according to the invention is of simple construction and may be readily installed simply by introduction through the end of the housing 92. The same is easy to operate, requiring only reciprocation and rotation of the T-handle 132. Furthermore the same is small and thus conserves space but can be readily accessed by a person operating on the AMAD. And while the invention has been described in connection with a manual connect-disconnect operator for an AMAD, those skilled in the art will readily appreciate that the same may be used in any of a variety of apparatus where a manual connect-disconnect operator for a coupling between two rotating elements is required.

I claim:

1. A manual connect-disconnect operator for a power transmission path comprising:
    a coupling member;
    a translatable carrier journalling said coupling member for rotation about an axis and mounting said coupling member for axial movement along said axis between connect and disconnect positions;
    a yoke mounted on a pivot and connected to said carrier for translating the carrier to move the coupling member upon pivotal movement of the yoke;
    a support shaft mounted for movement along its axis;
    a handle pivotally mounted to said support shaft;
    means, including said handle, for defining spaced detent corresponding to said connect and disconnect positions that may be engaged by pivoting said handle and moving said handle and said support shaft along said support shaft axis; and
    a reciprocating motion to rotary motion converting mechanism interconnecting said support shaft and said yoke;
    whereby when said support shaft is moved along its axis by said handle, said yoke will pivot to move said carrier between said positions.

2. The manual operator of claim 1 wherein a drive rod is connected to said yoke and defines said pivot and said converting mechanism includes a helical slot in one of said drive rod and said support shaft and a pin in said slot and carried by the other of said drive rod and said support shaft.

3. The manual operator of claim 1 wherein said detent defining means comprise a slot having two axially spaced and axially opening recesses and connected to each other by an elongated channel circumferentially offset from the recesses.

4. The manual operator of claim 3 including a housing mounting said support shaft, said slot being located in one of said housing and said handle and a pin movable in said slot and mounted on the other of said housing and said handle.

5. The manual operator of claim 4 wherein said pin is mounted on said housing and said slot is in said handle.

6. The manual operator of claim 4 further including interengaging means on said housing and said support shaft for preventing rotation of said support shaft.

7. A manual connect-disconnect operator for a power transmission path comprising:
    a coupling member;
    a translatable carrier journalling said coupling member for rotation about an axis and mounting said coupling member for axial movement along said axis between connect and disconnect positions;
    a lever mounted on a pivot and connected to said carrier for translating the carrier to move the coupling member upon pivotal movement thereof;
    a support shaft mounted for movement along its axis and including an operating section; and
    a reciprocating motion to rotary motion converting mechanism interconnecting said support shaft and said lever;
    whereby when said support shaft is moved along its axis by said operating section, said lever will pivot to move said carrier between said positions.

8. A manual connect-disconnect operator for a power transmission path comprising:
    a coupling member;
    a translatable carrier journalling said coupling member for rotation about an axis and mounting said coupling member for axial movement along said axis between connect and disconnect positions;
    a yoke mounted on a pivot and connected to said carrier for translating the carrier to move the coupling member upon pivotal movement of the yoke;
    a support shaft mounted for reciprocating movement along its axis and being restrained against rotation;
    a handle mounted to said support shaft; and
    a reciprocating motion to rotary motion converting mechanism interconnecting said support shaft and said yoke;
    whereby when said support shaft is moved along its axis by said handle, said yoke will pivot to move said carrier between said positions.

9. The manual operator of claim 8 further including a detent mechanism associated with one of said handle and said support shaft for positively locating said support shaft in positions corresponding to said connect and disconnect positions.

10. The manual operator of claim 9 wherein said detent mechanism is associated with said handle and said handle is movably connected to said support shaft to be movable relative thereto to cooperate with said detent mechanism.

11. The manual operator of claim 10 wherein said detent mechanism comprises a branched slot and a pin movable within the slot between the branches thereof.

12. The manual operator of claim 8 further including selectively operable locking means for locking said carrier in a desired position.

13. The manual operator of claim 12 wherein said locking means comprises a movable pin engageable with said carrier.

14. The manual operator of claim 13 further including a piston for moving said pin.

* * * * *